Sept. 27, 1966   L. S. KOZLOWSKI   3,274,809
FUEL TANK CAP LOCK
Filed Sept. 1, 1964

Lawrence S. Kozlowski
INVENTOR.

BY *Clarence A. O'Brien*
*and Harvey B. Jackson*
Attorneys

3,274,809
FUEL TANK CAP LOCK

Lawrence S. Kozlowski, Kawkawlin, Mich., assignor of twenty-five percent each to Edward Skipstead, Victor De Rosier, and Martin B. Legatz
Filed Sept. 1, 1964, Ser. No. 393,679
2 Claims. (Cl. 70—163)

This invention generally relates to new and useful improvements in filler cap locks particularly although by no means necessarily, for the exterior auxiliary saddle fuel tanks of long haul motor vehicles and has for its primary object to provide, in a manner as hereinafter set forth, novel means for positively preventing the unauthorized removal of such caps.

Another highly important object of the present invention is to provide an improved lock of the aforementioned character which is adapted to be readily used on existing caps.

Still another important object of the invention is to provide a fuel tank cap lock of the character described which is easily adjustable to meet various conditions.

Other objects are to provide a fuel tank cap lock which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
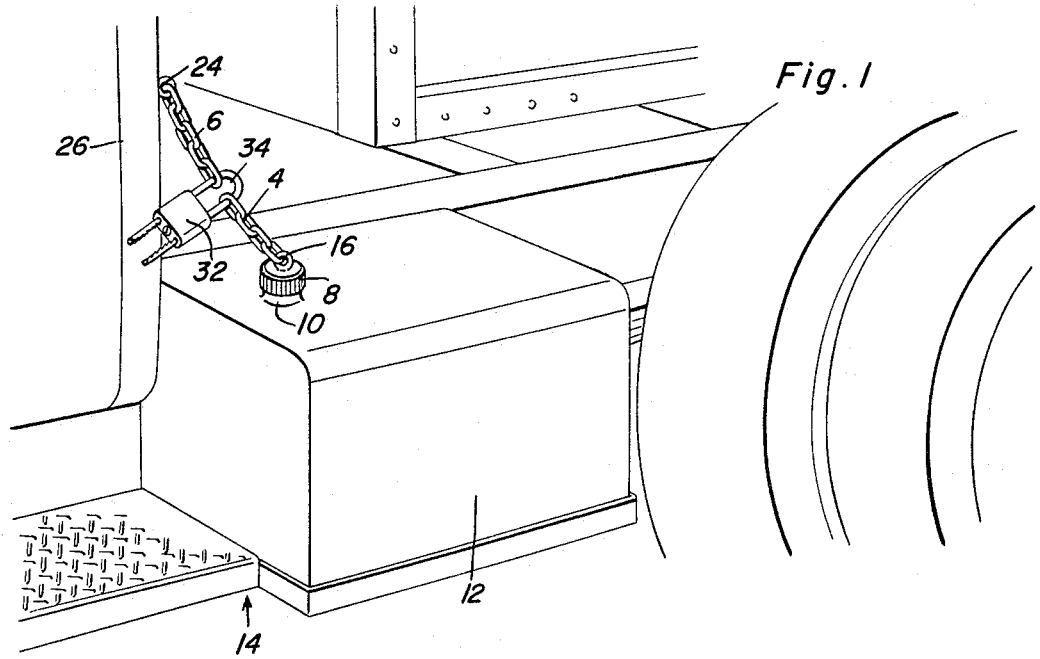
FIGURE 1 is a perspective view, showing a lock constructed in accordance with the present invention in use.

Referring now to the drawing in detail, it will be seen that the embodiment of the present invention which has been illustrated comprises a pair of metallic link chains 4 and 6 of suitable length. One end of the chain 4 is securely connected to a screw cap 8 on the usual threaded filler neck 10 of a conventional auxiliary fuel tank 12 of a motor vehicle 14 by an eyebolt 16. The eyebolt 16 is inserted through a hole or opening 18 which is provided therefor centrally in the cap 8 and has threaded thereon a retaining nut 20. A lock washer 22 is provided for the nut 20 on the eyebolt 16.

One end of the chain 6 is connected by a similar eyebolt 24 at a suitable location on the body structure 26 of the vehicle 14 which is adjacent the filler neck 10. A retaining nut 28 is threaded on the eyebolt 24 and a lock washer 30 is provided for said nut.

Figures 2, 3:
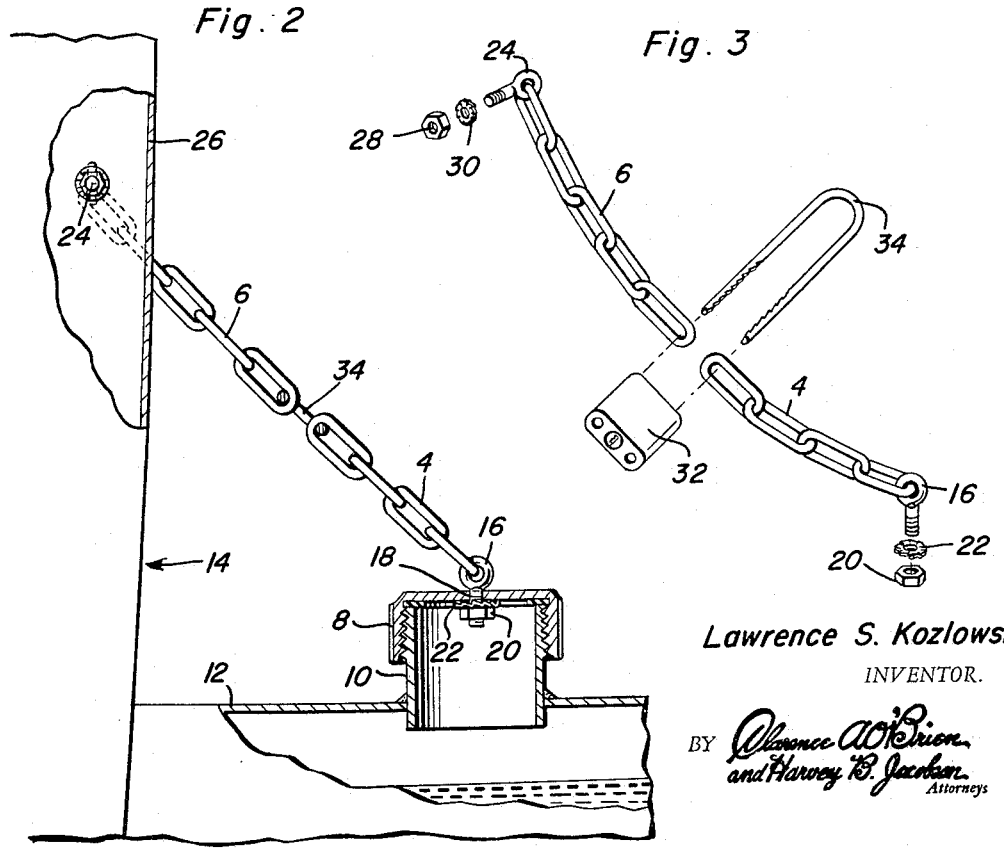
FIGURE 2 is an elevational view thereof with portions broken away in section.
FIGURE 3 is a perspective view of the device, showing the parts separated.

The other or free ends of the chains 4 and 6 are detachably connected through the medium of a padlock 32. As shown to advantage in FIGURE 3 of the drawing, the padlock 32 is of the type which includes an elongated, slidable and removable U-shaped shackle 34. As shown, the shackle 34 of the padlock 32 is insertable through the links on the free end portions of the chains 4 and 6.

It is thought that the use of the lock will be readily apparent from a consideration of the foregoing. Briefly, the chain 4 is permanently connected at one end to the filler cap 8 and the chain 6 is permanently connected at one end to the vehicle 14. The filler cap 8 is screwed home on the filler neck 10 of the fuel tank 12 in the usual manner. The chains 4 and 6 are then aligned to permit the shackle 34 to be inserted through the links on the free ends of said chains and secured in the lock 32. In this manner, the filler cap 8 is positively secured against unauthorized removal. In this connection, it will be observed that there is little or no slack in the connected chains 4 and 6. Thus, twisting of the chains 4 and 6 is definitely limited and the consequent shortening of said chains as they are twisted will prevent sufficient turning of the cap 8 to unscrew same from the filler neck 10. If necessary to meet various conditions, the shackle 34 of the padlock 32 may be inserted through any of the links of the chains 4 and 6. Of course, the chin sections may comprise any suitable number of links. Also, the eyebolts may be welded to the cap, the vehicle and the chain sections.

The foregoing is considered as illustrative only of the principles of the invention. Further, since numerous modifications and changes will readily occur to those skilled in the art, it is not desired to limit the inventions to the exact construction and operation shown and described, and accordingly all suitable modifications and equivalents may be resorted to, falling within the scope of the invention as claimed.

What is claimed as new is as follows:

1. In combination with a vehicle of the type including a fuel tank having one wall thereof provided with a fill opening, a filler neck secured to said one wall about said opening and projecting outwardly of said one wall, a closure cap removably threadedly secured on the outer end of and closing said filler neck, a link chain assembly having one end anchored to said cap against rotation relative thereto, said vehicle including a portion spaced outwardly of said one wall of said tank, the other end of said link chain assembly being secured to said vehicle portion against rotation relative thereto with said link chain assembly extending away from said one wall toward said vehicle portion in a reasonably taut condition, said link chain assembly including a pair of opposite end link chain sections, and lockable fastener means removably securing adjacent ends of said sections together against more than limited rotation relative to each other.

2. The combination of claim 1 wherein said lockable fastener means comprises a lock assembly having the leg portions of the removable hasp thereof passed through links of the adjacent ends of said link chain sections.

References Cited by the Examiner
UNITED STATES PATENTS

| | | | |
|---|---|---|---|
| 358,732 | 3/1887 | Clisbee | 70—164 |
| 1,025,284 | 5/1912 | Lybeck | 70—85 |
| 1,563,224 | 11/1925 | Peabody | 70—170 X |
| 1,789,492 | 1/1931 | Nisbett et al. | 70—164 X |
| 1,806,124 | 5/1931 | Smith | 70—158 X |

BOBBY R. GAY, *Primary Examiner.*